(12) United States Patent
Camenisch

(10) Patent No.: US 7,555,652 B2
(45) Date of Patent: Jun. 30, 2009

(54) METHOD FOR USER ATTESTATION SIGNATURES WITH ATTRIBUTES

(75) Inventor: Jan Camenisch, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 10/575,158

(22) PCT Filed: Aug. 20, 2004

(86) PCT No.: PCT/IB2004/002716

§ 371 (c)(1),
(2), (4) Date: Mar. 6, 2007

(87) PCT Pub. No.: WO2005/038635

PCT Pub. Date: Apr. 28, 2005

(65) Prior Publication Data

US 2007/0245138 A1    Oct. 18, 2007

(30) Foreign Application Priority Data

Oct. 17, 2003  (EP) ............... 03405749.7
Mar. 24, 2004  (EP) ............... 04405181.1

(51) Int. Cl.
*H04L 9/00* (2006.01)
*H04L 9/32* (2006.01)
*G06F 7/04* (2006.01)
*G06F 17/30* (2006.01)
*G06F 7/58* (2006.01)
*G06K 9/00* (2006.01)
*G06K 19/00* (2006.01)
*G06F 15/16* (2006.01)

(52) U.S. Cl. ............... 713/180; 713/156; 713/157; 713/168; 713/173; 713/175; 726/2; 726/4; 726/10

(58) Field of Classification Search ............... 713/180, 713/182; 380/278
See application file for complete search history.

(56) References Cited

U.S. PATENT DOCUMENTS

| | | | |
|---|---|---|---|
| 7,165,181 B2 * | 1/2007 | Brickell | 713/182 |
| 2002/0004900 A1 * | 1/2002 | Patel | 713/155 |
| 2002/0038291 A1 * | 3/2002 | Petersen et al. | 705/67 |
| 2003/0190046 A1 * | 10/2003 | Kamerman et al. | 380/286 |
| 2003/0195857 A1 * | 10/2003 | Acquisti | 705/74 |
| 2005/0223007 A1 * | 10/2005 | Zimmer et al. | 707/9 |
| 2009/0019285 A1 * | 1/2009 | Chen et al. | 713/175 |

* cited by examiner

*Primary Examiner*—Shin-Hon Chen
(74) *Attorney, Agent, or Firm*—Michael J. Buchenhorner; Vazken Alexanian; Louis P. Herzberg

(57) ABSTRACT

A method for generating and verifying a user attestation-signature value and issuing an attestation value for using a user attestation-signature value that corresponds to at least one attribute, each with an attribute value remaining anonymous includes: providing a module public key and a security module attestation value providing a user public key that includes: at least one user determined attribute value and a proof value demonstrating that the user public key is validly derived from the module public key of the security module deriving an attester determined attribute value and an attestation value based on an attester secret key, the user public key, and an anonymous attribute value and verifying whether or not (i) the user attestation-signature value was validly derived from the security module attestation value provided by the security module and the attestation value, (and ii) the attestation value is associated with a subset of at least one attribute, each attribute in the subset having a revealed attribute value.

1 Claim, 2 Drawing Sheets

METHOD FOR USER ATTESTATION SIGNATURES WITH ATTRIBUTES

CROSS REFERENCE AND PRIORITY

This application filed under 35 USC 371, is cross-referenced with, and claims priority from, International Patent Application PCT/IB2004/002716 filed on Aug. 20, 04, and published in English with Publication No. PCT WO2005/038635 with publication date: 28 Apr 2005 under PCT article 2 1(2), which in turn claims priority of EP 03405749.7 filed on Oct. 17, 03, and EP 04405181.1 filed Mar. 24, 2004.

TECHNICAL FIELD

The present invention is related to a method for generating and verifying a user attestation-signature value and issuing an attestation value for the generation of the user attestation-signature value. Further, the invention is related to a system for using the user attestation-signature value. Moreover, the invention is also related to a computer program element for performing the method and a computer program product stored on a computer usable medium for causing a computer to perform the methods.

BACKGROUND OF THE INVENTION

Computers have evolved to tools for many applications and services. In today's world a trustworthy computing environment becomes more and more a desire. Comprehensive trust, security, and privacy functions are required to establish multi-party trust between devices, upon which content providers, application and service providers, consumers, enterprises and financial institutions, and particularly users can rely.

For that, a trusted platform module (TPM) has been established. The role of the module is to offer protected storage, platform authentication, protected cryptographic processes and attestable state capabilities to provide a level of trust for the computing platform. The foundation of this trust is the certification by a recognized authority that the platform can be trusted for an intended purpose. A so-called trusted computing group (TCG) develops and promotes open industry standard specifications for trusted computing hardware building blocks and software interfaces across multiple platforms, including PC's, servers, PDA's, and digital phones. This will enable more secure data storage, online business practices, and online commerce transactions while protecting privacy and individual rights. Users will have more secure local data storage and a lower risk of identity theft from both external software attack and physical theft.

To realize the functionality of attestable states, an issuer issues a certificate to the trusted platform module, hereafter also abbreviated as TPM, as to allow the TPM to later prove remotely that it is a genuine TPM and therefore a verifying party can have confidence stated and attested by the TPM. To allow the TPM to prove it is genuine without that the verifying party can identify the TPM, a so-called direct anonymous attestation (DAA) sing protocol has been specified by the trusted computing group. The protocol allows the TPM to convince a verifying party that it obtained attestation by an issuer without revealing its identity.

Further, the TCG specified a DAA issue protocol to provide attestation (with a certificate) to a platform's TPM such that the platform can later prove to any party that it preserved attestation without that the verifying party can identify the platform or link this proof of attestation with other proofs of attestation that the platform provided.

The direct anonymous attestation procedure however does not allow to include predicates or attributes that the platform can use or show to any verifier in an anonymous way when proving that it got attestation.

From the above it follows that there is still a need in the art for an improved protocol and system that allow attestation with certified/attested attributes or attribute values which remain anonymous within the transactions.

GLOSSARY

The following are informal definitions to aid in the understanding of the description.

| | |
|---|---|
| attribute(s) | A, B, C, D with respective attribute values w, x, y, z |
| x, y | attester hidden attribute value, or user determined attribute value |
| w, z | attester revealed attribute value, attester determined attribute value, or anonymous attribute value |
| w, y | verifier hidden attribute value |
| x, z | verifier revealed attribute value, revealed attribute value, or non-anonymous attribute value |
| TPM | trusted platform module |
| $PK_{UC}$ | user public key |
| $PK_{AC}$ | attester public key with values n, g, g', h, S, Z, $R_0$, $R_1$, $\Gamma$, $\gamma$, $\rho$ |
| $PK'_{AC}$ | modified attester public key |
| $SK_{AC}$ | attester secret key |
| cert | attestation value |
| cert' | user value |
| DAA' | user attestation-signature value |
| DAA | security module attestation value, or part of the user attestation-signature value |
| $f_0, f_1, v'$ | TPM secret values |
| a | first part of attestation value cert, or first attestation value |
| c, sf0, sf1, sv, sx, sy | proof values, with sx, sy being augmented proof values |
| c | part of proof values |
| c' | second proof verification value |
| C' | second signature value, or intermediate user attestation-signature value |
| $c_h$ | intermediary proof value |
| e | second part of attestation value cert, being a random prime |
| G' | first user attestation-signature verification value |
| G, sf0', sf1', sv' | part of security module attestation value DAA |
| sy', sw', se', seu' | part of user attestation-signature value DAA' |
| $T_1$ | part of user attestation-signature value DAA' |
| $T'_1$ | first signature value, or first security module attestation value |
| $T''_1$ | intermediary user attestation-signature value |
| $T'''_1$ | intermediary user attestation-signature verification value |
| U | part of public key of security module $PK_{TPM}$ |
| U' | intermediary proof value |
| U'' | first proof verification value |
| U''' | intermediary certificate value |
| v | secret signature value, with v = v' + v'' |
| v'' | third part of attestation value cert, being a random integer |
| W | first intermediary user proof value |
| W' | second intermediary user proof value |

SUMMARY AND ADVANTAGES OF THE INVENTION

In the following are proposed a system and methods which allow attestation with certified/attested attributes or attribute values that remain anonymous within transactions. In general, the attestation can comprise predicates that can later be shown anonymously. That is, the attestation can comprise several properties or attributes of a platform or its user. The transactions are performed between a user's user computer having a trusted platform module, an attestor or attester computer, e.g., a privacy certification authority, and a verifier or verifying party, which typically is a verification computer. As indicated, the user device has a security module, herein also referred to as trusted platform module (TPM), and together referred to as platform, which allows platform authentication, protected cryptographic processes, and attestable state capabilities. When the TPM anonymously proves that it got attestation, each property or attribute can either be shown or hidden. For instance, for a platform having attestation could mean that it is a valid platform, e.g., laptop, PDA, mobile, etc., of some company. Then, the attributes could be used to encode a particular branch or site of the company. When proving that it had obtained attestation, the platform could be granted access to some resource, e.g., the company's LAN (via wireless access points or the public Internet). Using the properties/attributes, one could then for instance tell whether it's a local user or a guest from another branch.

The attributes or properties comprised in the attestation can be determined by the user, by the attestor, or by both of them together.

An alternative would be to store some properties/attributes of the platform in the TPM and then have the TPM to send them to the verifier signed with a temporal secret key, the public key of which the TPM signs with the anonymous attestation protocol. These properties/attributes could be written into the TPM during manufacturing and could not be changed afterwards. Clearly, this allows one only handle properties/attributes that are supported by the TPM and does not allow to change them, which is rather inflexible. In the proposed system and methods, however, the number and kind of property/attribute in not restrained by the TPM, the properties/attributes can be changed, and the properties/attributes can be certified by anyone, i.e., also by entities different from the manufacturer.

Each property or attribute has a property or attribute value. In the following, only the term attribute and attribute value is used for simplicity.

In accordance with the present invention, there is provided a system for using a user attestation-signature value DAA' that corresponds to at least one attribute (A, B, C, D) with an attribute value (w, x, y, z), none, one or more of the attribute values (x, y) remaining anonymous for and in transactions. The system comprises a user device having a security module that provides a module public key $PK_{TPM}$ and a security module attestation value DAA. The user device provides a user public key $PK_{UC}$ that inherently comprises a user determined attribute value (x, y) and a proof value demonstrating that the user public key $PK_{UC}$ is validly derived from the module public key $PK_{TPM}$ of the security module. The system further comprises an attester computer that provides an attester determined attribute value (w, z) and an attestation value cert that bases on an attester secret key $SK_{AC}$, the user public key $PK_{UC}$, and usually an attester determined attribute value (w, z). The system further comprises a verification computer for verifying whether or not (i) the user attestation-signature value DAA' was validly derived from the security module attestation value DAA provided by the security module and the attestation value cert, and (ii) the attestation value cert is associated with a subset (B, D) of at least one attribute, each attribute in the subset (3, D) having a revealed attribute value (x, z).

In accordance with a further aspect of the present invention, there is provided a method for generating a user attestation-signature value DAA' for use with a verification computer, the user attestation-signature value DAA' corresponding to at least one attribute (A, B, C, D), each with an attribute value (w, x, y, z), none, one, or more of the attribute values (w, y) remaining anonymous in transactions performable by a user device having a security module with the verification computer. The method comprises the steps of providing a user public key $PK_{UC}$ and a proof value that demonstrates that the user public key $PK_{UC}$ was validly derived from a module public key $PK_{TPM}$ of the security module;

receiving from an attester computer
  (I) an attestation value cert having the at least one attribute (A, B, C, D) with its attribute value (w, x, y, z), none, one or more of the attribute values (x, y) remaining unknown to the attester computer,
    the attestation value cert being derived from an attester secret key $SK_{AC}$, a user public key $PK_{UC}$, and none, one, or more attester determined attribute values (w, z),
    the user public key $PK_{UC}$ inherently comprising none, one, or more user determined attribute values x, y, and
  (II) at least one of the attester determined attribute values (w, z); and deriving the user attestation-signature value DAA' from the attestation value cert and a security module attestation value DAA provided by the security module, wherein it is verifiable whether or not (i) the user attestation-signature value DAA' was validly derived from the security module attestation value DAA and the attestation value cert, and that (ii) the attestation value cert is associated with a subset (B, D) of at least one attribute, each attribute in the subset (B. D) having a revealed attribute value (x, z).

The step of deriving the user attestation-signature value DAA' can further comprise the steps of: receiving from the security module a first security module attestation value $T'_1$; deriving an intermediate user attestation-signature value C' from the first security module attestation value $T_1$ under use of an attester public key $PK_{AC}$ and a hash function; providing the intermediate user attestation-signature value C' to the security module; receiving from the security module a part of the user attestation-signature value DAA'; and calculating by the user device further parts of the user attestation-signature value DAA' using none, one, or more attribute values (w, y) encoded in the attestation value cert but which are not to be revealed to the verifier and therefore are also referred to as verifier hidden attribute values (w, y), the received part of the user attestation-signature value DAA', the user public key $PK_{UC}$, and the attester public key $PK_{AC}$. This guarantees that these attribute values remains unknown to the verification computer.

The user public key $PK_{UC}$ can be derived from the module public key $PK_{TPM}$ by using the attester public key $PC_{AC}$ and the one or more of the attribute values (x, y). By doing so, it is affirmed that these attester hidden attribute values (x, y) remains unknown to the attestor, i.e. the attester computer.

The user device can provide encryptions under a trusted third party's public key of one or more of the verifier hidden attribute values (w, y), i.e. the user determined attribute values w, y that remain unknown to the verification computer. This allows the trusted third party to later recover the verifier hidden attribute values (w, y).

In accordance with a another aspect of the present invention, there is provided a method for issuing an attestation value cert for the generation of a user attestation-signature value DAA' corresponding to at least one attribute (A, B, C, D), each with an attribute value (w, x, y, z), none, one or more, of the attribute values (w, y) remaining anonymous for transactions performable by a user device having a security module with an attester computer. The method comprises the steps of receiving from the user device a user public key $PK_{UC}$ that inherently comprises none, one, or more user determined attribute value (x, y) invisible to the attester computer and a proof value demonstrating that the user public key $PK_{UC}$ was validly derived from a module public key $PK_{TPM}$ of the security module; issuing the attestation value cert based on an attester secret key $SK_{AC}$, the received user public key $PK_{UC}$, and none, one, or more attester determined attribute value (w, z); and providing the attestation value cert to the user device, wherein the user attestation-signature value DAA' is derivable by the user device from the attestation value cert and a security module attestation value DAA provided by the security module, and it is verifiable whether or not (i) the user attestation-signature value DAA' was validly derived from the security module attestation value DAA and the attestation value cert and that (ii) the attestation value cert is associated with a subset (B, D) of at least one attribute, each attribute in the subset (B, D) having a revealed attribute value (x, z).

In accordance with a yet a further aspect of the present invention, there is provided a method for verifying a user attestation-signature value DAA' generated from an attestation value cert, the user attestation-signature value DAA' corresponding to at least one attribute (A, B, C, D), each with an attribute value (w, x, y, z), none, one, or more of the attribute values (w, y) remaining anonymous for transactions performable by a user device having a security module with a verification computer. The method comprises the steps of receiving from the user device the user attestation-signature value DAA'; and verifying whether or not (i) the user attestation-signature value DAA' was validly derived from a security module attestation value DAA provided by the security module and an attestation value cert, and (ii) the attestation value cert is associated with a subset (B, D) of at least one attribute, each attribute in the subset (B, D) having a revealed attribute value (x, z), the attestation value cert being derived from an attester secret key $SK_{AC}$, a user public key $PK_{UC}$, and an attester determined attribute value (w, z) that remains anonymous, the user public key $PK_{UC}$ inherently comprising a user determined attribute value (x, y), i.e. an attester hidden attribute value.

The step of verifying can further comprise computing a first user attestation-signature verification value G' by using the user attestation-signature value DAA', the attester public key $PC_{AC}$, and the revealed attribute value (x, z); and checking whether or not the first user attestation-signature verification value G' is comprised in the user attestation-signature value DAA'.

DESCRIPTION OF THE DRAWINGS

Preferred embodiments of the invention are described in detail below, by way of example only, with reference to the following schematic drawings.

The drawings are provided for illustrative purposes only.

DETAILED DESCRIPTION OF EMBODIMENTS

Before the embodiments of the invention are described with reference to the figures, some general issues to an attestation scheme are addressed.

A direct anonymous attestation protocol involves an issuer or attestor, a trusted platform module (TPM), a host platform (host) with the TPM, and several verifiers. All communication of the TPM is performed via its host. The issuer or attestor issues an attestation to the host and the TPM together in such a way that when proving that attestation has been obtained, the host can only do so when involving the TPM, proving possession of an attestation can be done anonymously (or pseudonymously), i.e., such that no verifier can not link two different proofs (or proofs with different verifiers can not be linked).

Thus, the attestation scheme comprises four procedures:
a "key generation" that allows the issuer to generate the public and secret keys of the attestation scheme;
a "join protocol" that is run between a host/TPM and the issuer and allows the host/TPM to obtain attestation;
a "sign procedure" that is run between a host and the TPM that allows them to anonymously prove that they got attestation and at the same time authenticating a message, the result of this proof is a signature that can be sent to a verifier; and
a "verify procedure" that allows a verifier to check whether or not a platform got attestation and whether this platform authenticated a given message.

The attestation can comprise several attributes, whereby each attribute can either be shown or hidden. The attributes can be determined by the user, by the attestor, or by both of them together. When proving that an attestation that comprises attributes has been obtained, a user can choose which attributes can be revealed to the verifier and which should not be revealed.

The following figures and descriptions show how a user attestation-signature value can be applied.

Figure 1:
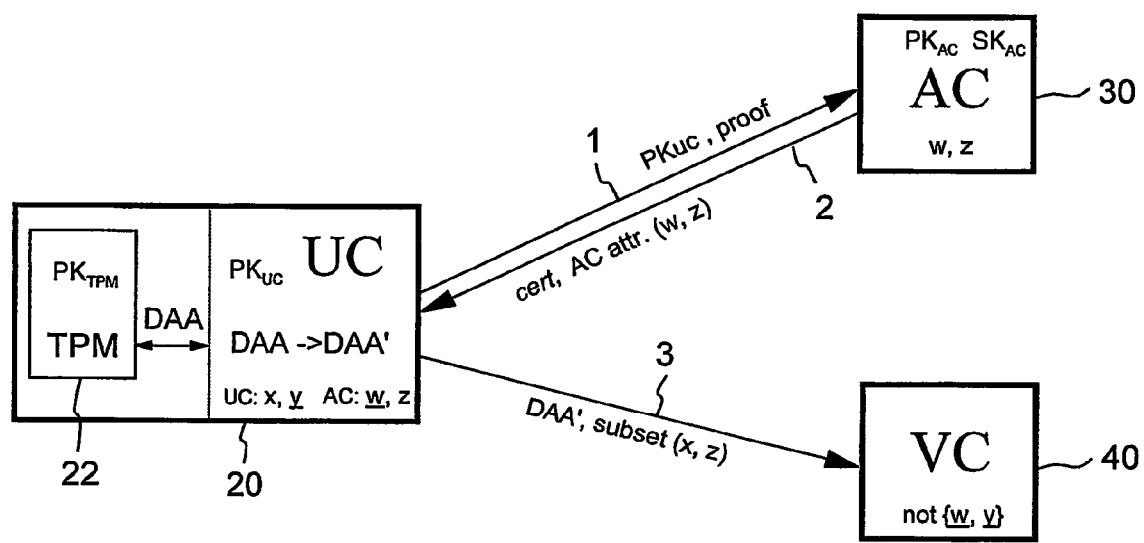
FIG. 1 shows a schematic illustration of a scenario with an attester computer (AC), a user computer (UC) having a trusted platform module (TPM), and a verification computer (VC).

FIG. 1 shows a schematic illustration of a system with an attester computer 30, also labeled with AC, a user device 20 comprising a security module 22 which are labeled with UC and TPM, respectively, and a verification computer 40, labeled with VC. The user device 20 that represents the host platform (host) or short platform is connected to the attester computer 30, herein also referred to as issuer or attestor, and the verification computer 40, i.e., the verifier. The system allows to use a user attestation-signature value DAA' that corresponds to attributes A, B, C, D having an attribute value w, x, y, z. The system is designed such that verifier hidden attribute values w, y remain anonymous in transactions with the verification computer 40.

Beside the verifier hidden attribute values w, y, which are also called anonymous attribute values, the attribute values are named as follows:

x, y—attester hidden attribute values, or user determined attribute values as they are determined by the user; w, z—attester revealed attribute values, or attester determined attribute values as they are determined by the attestor, x, z—verifier revealed attribute values, revealed attribute values, or non-anonymous attribute values.

The TPM, i.e., the security module 22, provides a module public key $PK_{TPM}$ while the user device 20 further provides a user public key $PK_{UC}$ that inherently comprises the user determined attribute value x, y and a proof value or values demonstrating that the user public key $PK_{UC}$ is validly derived from the module public key $PK_{TPM}$ of the security module 22. The security module 22 further provides a security module attestation value DAA that is a part of the user attestation-signature value DAA'.

The attester computer 30 provides an attester public key $PC_{AC}$ and has an attester secret key $SK_{AC}$. Moreover, the attester computer 30 provides the attester determined attribute values w, z and an attestation value cert that bases on the attester secret key $SK_{AC}$, the user public key $PK_{UC}$, and the attester determined attribute value w, z.

The verification computer 40 can verify whether or not (i) the user attestation-signature value DAA' was validly derived from the security module attestation value DAA provided by the security module 22 and the attestation value cert, and (ii) the attestation value cert is associated with a subset of the attributes B, D having the revealed attribute values x, z.

In operation, as indicated in the figure with arrow 1 and labeled with "$PK_{UC}$, proof", the user device 20 sends to the attester computer 30 the user public key $PK_{UC}$ that inherently comprises the user determined attribute value x, y and the proof value or values. In return the attester computer 30 sends back the attestation value cert and the attester determined attribute value w, z., as indicated with arrow 2, labeled with "cert, AC attr. (w, z)". The user device 20 can then send the user attestation-signature value DAA' together with a subset of attributes comprising here the revealed or non-anonymous attribute values x, z, as indicated with arrow 3 and labeled with "DAA', subset (x, y)", to the verification computer 40 that then can initiate the verification procedure.

Figure 2:
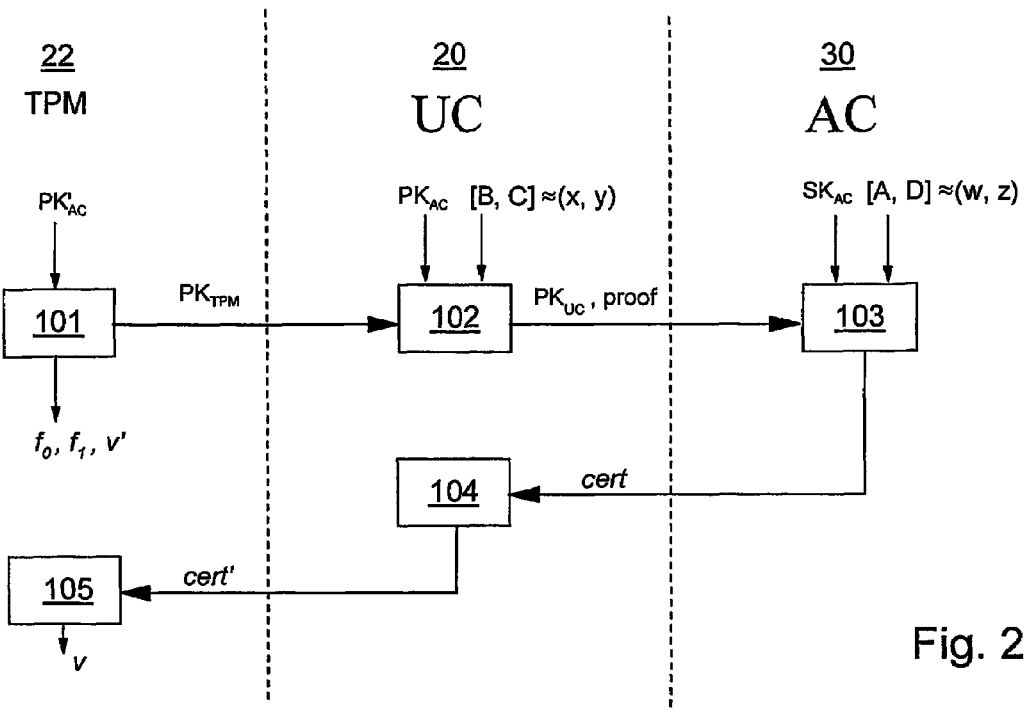
FIG. 2 shows a schematic flow between the trusted platform module (TPM), the user computer (UC), and the attester computer (AC).

FIG. 2 shows a schematic flow between the trusted platform or security module 22, the user computer 20, and the attester computer 30 as it is indicated with the arrows 1 and 2 labeled with "$PK_{UC}$, proof" and "cert, AC attr. (w, z)", respectively, in FIG. 1. At first, in step 101 the security module 22 generates the module public key $PK_{TPM}$ and TPM secret values $f_0, f_1, v'$ from a modified attester public key $PK'_{AC}$. The user device 20 uses the module public key $PK_{TPM}$ in step 102 together with the attester public key $PC_{AC}$ and the user determined attribute values x, y of the attributes B, C in order to generate the user public key $PK_{UC}$ that inherently comprises the user determined attribute values x, y and to generate the proof value or values, indicated with "proof", demonstrating that the user public key $PK_{UC}$ is validly derived from the module public key $PK_{TPM}$ of the security module 22. The proof comprises proof value c, sf0, sf1, sv, sx, sy as described in more detail below. The attester computer 30 generates then in step 103 with the "$PK_{UC}$, proof", the attester secret key $SK_{AC}$, and the attester determined attribute value w, z the attestation value cert. As indicated with arrow 2 in FIG. 1, the attestation value cert together with the attester determined attribute values w, z are then provided to the user computer 20 which in step 104 generates a user value cert'. This user value cert' is then used by the security module 22 in step 105 to generate a secret signature value v.

Figure 3:
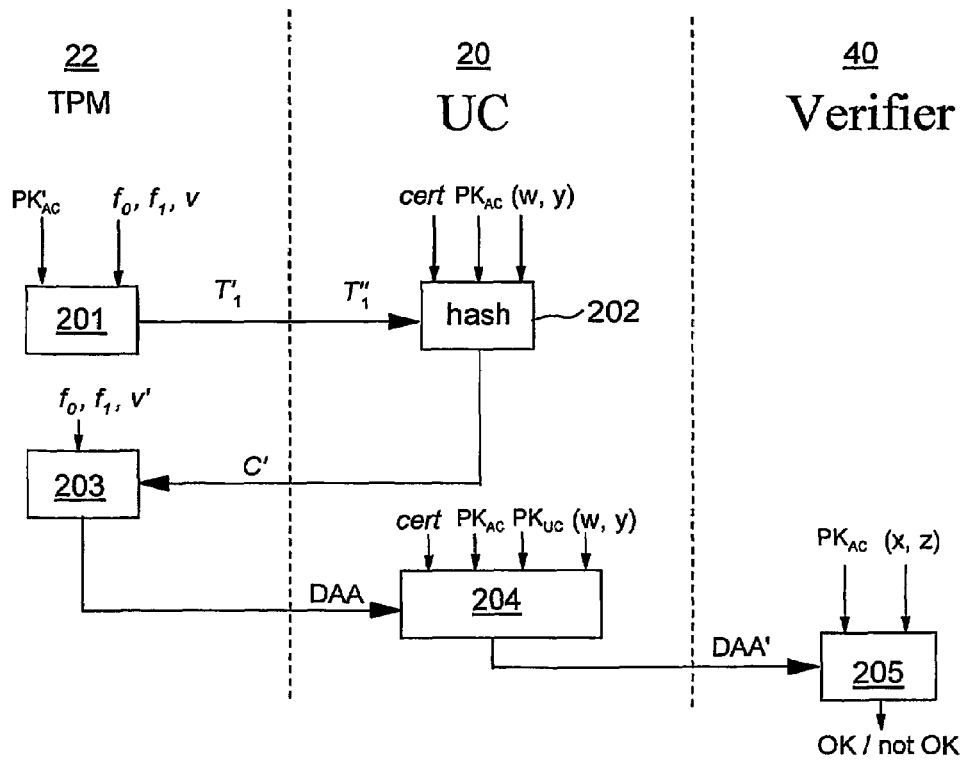
FIG. 3 shows a schematic flow for the generation and verification of a user attestation-signature value DAA' between the trusted platform module (TPM), the user computer (UC), and the verifier, i.e. the verification computer (VC).

FIG. 3 shows a schematic flow for the generation and verification of the user attestation-signature value DAA' between the security module 22, i.e. the TPM, the user computer 20, also referred to as platform 20, and the attester computer 30 as it is indicated with arrow 3 labeled with "DAA', subset (x, y)" in FIG. 1. In step 201 the security module 22 generates from the modified attester public key $PK'_{AC}$, some of the TPM secret values f0, f1, and the secret signature value v a first signature value $T'_1$, also referred to as first security module attestation value. When the first signature value $T'_1$ is received by the platform 20 an intermediary user attestation-signature value $T''_1$ is computed or derived from the first signature value $T_1$. The platform 20 uses then the intermediary user attestation-signature value $T''_1$ in step 202 together with the attestation value cert, the attester public key $PC_{AC}$ and the verifier hidden attribute values w, y to generate with a hash function a second signature value C', also referred to as intermediate user attestation-signature value. This second signature value C' and the TPM secret values $f_0, f_1, v'$ are used in step 203 by the security module 22 to generate a security module attestation value DAA. The platform 20 is then able to derive from the security module attestation value DAA in step 204 together with the attestation value cert, the attester public key $PC_{AC}$, the user public key $PK_{UC}$, and the verifier hidden attribute values w, y the user attestation-signature value DAA'.

When the user computer 20 provides the user attestation-signature value DAA' to the verification computer 40, this verifier can then under use of the attester public key $PC_{AC}$ and the revealed attribute values x, z verify whether or not the user attestation-signature value DAA' was validly derived from the security module attestation value DAA and an attestation value cert, and further whether or not the attestation value cert is associated with a subset B, D of the attributes with the revealed attribute values x, z. As indicated with the output arrow from the verification step 205, it turns out either "OK" or "not OK", i.e. either the verification is valid or not.

More precisely, the public key of the attester computer 30, hereafter called attestor, normally comprising the values $(n, g, g', h, S, Z, R_0, R_1, \Gamma, \gamma, \rho)$ is augmented with base values $R_2, \ldots, R_k$. Each of these base values $R_2, \ldots, R_k$ corresponds to a particular attribute A, B, C, D, e.g., A corresponds to $R_2$, B corresponds to $R_3$, C corresponds to $R_4$, and D corresponds to $R_5$. In the following only the base values $R_2, \ldots, R_5$ are used, however, it is straightforward, to generalize the description as to use any number of such values.

To obtain an attestation value cert from the attestor, the user computer 20, hereafter called platform, receives a value U from the security module 22, hereafter called TPM, and computes $$U' = U \cdot R_2^x \cdot R_3^y \bmod n$$

and sends this value to the attestor. The value U is also called part of the public key of security module $PK_{TPM}$ whilst the computed U' is also referred to and used as intermediary proof value.

Here it is assumed that the platform keeps the first two attributes hidden from the attestor, however note that one could use any subset of attributes instead. Furthermore, the platform receives at least a first intermediary user proof value W from the TPM from which the platform computes the second intermediary user proof value $$W' = W \cdot R_2^{r2} \cdot R_3^{r3},$$

where r2 and r3 are randomly chosen integers. Note that the computation of W' should correspond to the computations of U', that is, each of the base values $R_i$ that appears in the computation of U' should appear in the computation of W' with a random exponent ri. The platform then uses W' instead of W in the computation of an intermediary proof value $c_h$ as input to the hash function and sends $c_h$ to the TPM. The TPM will respond with further proof values c, sf0, sf1, and sv. The platform augments these further proof values with values sx=r2 +c·x and sy=r3+c·y and sends these augmented proof values to the attestor. The attestor verifies these proof values by computing a first proof verification value $$U''' = U'^e \cdot S^{sv} \cdot R_0^{sf0} \cdot R_1^{f2y} \cdot R_2^{sx} \cdot R_3^{sy} \bmod n,$$

using U''' in the input to the hash function to derive a second proof verification value c' and verifying whether c' equals the value c contained in the augmented proof values. If these verification succeeds, the attestor computes an intermediary certificate value $$U'''' = U' \cdot R_4^w \cdot R_5^z \bmod n,$$

where w and z are the attester determined attribute values, chooses a random prime e of suitable size and a random integer v''', and computes a first attestation value $$a = (Z/(U'''' \cdot S^{v'''}))^{1/e} \bmod n.$$

Similar to the attributes values determined by the platform, the attestor could chose different attribute values. If the attestor uses one base value $R_i$ that was used also by the platform, then the corresponding attributes will be jointly determined by the platform and the attestor. This issue is not further pursued here. The attestor sends the attestation value parts a, e, v''' to the platform together with the attester determined attribute values w, z.

When the platform wants to prove attestation to a verifier, i.e., the verification computer 40, that knows the attribute values x and z, it proceeds as follows: It first chooses a random integer u and computes $$T_1 = a \cdot h^u \bmod n$$

and sends $T_1$ as part of user attestation-signature value DAA' to the verification computer 40, hereafter called verifier. Then it receives a first signature value $T'_1$ from the TPM and computes an intermediary user attestation-signature value $$T''_1 = T'_1 \cdot a'^{re} \cdot h^{reu} \cdot R_3^{t3} \cdot R_4^{t4} \bmod n$$

where re, reu, t3, and t4 are random integers and the $R_3$ and $R_4$ are the base values that correspond to the attributes that remain anonymous, i.e., hidden from the verifier. If the platform wants to hide other attribute values, it should use the corresponding bases instead of $R_3$ and $R_4$ (and corresponding random integer exponents instead of t3 and t4) in the computation of $T''_1$. The platform then uses $T''_1$ and some other values as input to a hash function to derive the second signature value C', as indicated with step 202 in FIG. 3. The platform sends C' to the TPM and receives the security module attestation values DAA that comprises the values G, sf0', sf1', sv'. The platform augments these security module attestation with at least the values sy'=t3+G·y, sw'=t4+G·w, se'=re+G·e, and seu'=reu+G·e·u and sends the resulting list of values as user attestation-signature value DAA' to the verifier.

Verifying such a received user attestation-signature value DAA' comprises computing by the verifier an intermediary user attestation-signature verification value $$T'''_1 = (T'_1/(R_2^x \cdot R_5^z))^G \cdot S^{sv'} \cdot R_0^{sf0'} \cdot R_1^{sf1'} \cdot T_1^{se'+GL} \cdot h^{-seu'} \cdot R_3^{sy'} \cdot R_4^{sw'} \bmod n,$$

where L is a security parameter, and using $T'''_1$ in the input to the hash function to derive a first user attestation-signature verification value G', and verifying whether G' equals value G contained in the user attestation-signature value DAA'. As G is part of the security module attestation value DAA that is part of the user attestation-signature value DAA' it is also part of the user attestation-signature value DAA'.

Any disclosed embodiment may be combined with one or several of the other embodiments shown and/or described. This is also possible for one or more features of the embodiments.

The present invention can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A method for attestation comprising:
performing an attestation scheme using a security module of a user device, said security module being operatively coupled with a verification computer and an attester computer, the performing step comprising steps of:
generating a user attestation-signature value for use with the verification computer, the user attestation-signature value corresponding to at least one attribute, each at least one attribute comprising an attribute value, wherein at least one of the attribute values remain hidden for transactions performable by the user device, the step of generating as performed by the security module comprising the steps of:
providing a module public key and a security module attestation value that is a part of the user attestation-signature value;
receiving from the user device a user public key comprising the user determined attribute value x, y and a proof value demonstrating that the user public key is validly derived from the module public key of the security module;
receiving from the attester computer:
(I) an attestation value comprising the at least one attribute with its corresponding attribute value, wherein at least one of the attribute values are unknown to the attester computer,
the attestation value being derived from an attester secret key, a user public key, and the at least one attester determined attribute values,
the user public key comprising at least one of the user determined attribute values, and
(II) at least one of the attester determined attribute values (w, z); and deriving the user attestation-signature value from the attestation value and a security module attestation value,
wherein it is verifiable whether or not
(i) the user attestation-signature value is validly derived from the security module attestation value and the attestation value, and that
(ii) the attestation value is associated with a subset of at least one attribute, each attribute in the subset comprising a revealed attribute value;

wherein the step of deriving the user attestation-signature value comprises the steps of:
- deriving a first security module attestation value;
- deriving an intermediate user attestation-signature value from the first security module attestation value under use of an attester public key and a hash function; and
- calculating further parts of the user attestation-signature value using at least one of the attribute values, the received part of the user attestation-signature value, the user public key, and the attester public key;

wherein the user public key is derived from the module public key by using the attester public key and the one or more of the attribute values;

wherein the user device provides encryptions under a trusted third party's public key of at least one of the attribute values that remain unknown to the verification computer; and providing the user attestation-signature value to the verification computer for verification.

* * * * *